US011824652B1

United States Patent
Ram et al.

(10) Patent No.: US 11,824,652 B1
(45) Date of Patent: *Nov. 21, 2023

(54) PHYSICAL LAYER PREAMBLE FOR WIRELESS LOCAL AREA NETWORKS

(71) Applicant: Marvell Asia Pte Ltd, Singapore (SG)

(72) Inventors: B Hari Ram, Chennai (IN); Vijay Ahirwar, Pune (IN); Sri Varsha Rottela, Visakhapatnam (IN); Hongyuan Zhang, Fremont, CA (US); Sudhir Srinivasa, Los Gatos, CA (US); Nilesh Khude, Pune (IN)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,373

(22) Filed: Jun. 23, 2022

Related U.S. Application Data

(63) Continuation of application No. 16/703,352, filed on Dec. 4, 2019, now Pat. No. 11,374,683.
(Continued)

(51) Int. Cl.
*H04L 1/00* (2006.01)
*H04L 5/00* (2006.01)

(52) U.S. Cl.
CPC ............ *H04L 1/003* (2013.01); *H04L 1/0003* (2013.01); *H04L 1/0061* (2013.01); *H04L 5/0053* (2013.01)

(58) Field of Classification Search
CPC ..... H04L 1/003; H04L 1/0003; H04L 1/0061; H04L 5/0053
See application file for complete search history.

(56) References Cited

U.S. PATENT DOCUMENTS 8,874,477 B2 * 10/2014 Hoffberg ............... G06Q 20/065
705/37
8,923,282 B2 * 12/2014 Sampath ............... H04W 88/00
370/328
(Continued)

FOREIGN PATENT DOCUMENTS

EP          3435557 A1 *  1/2019  ............. H04B 10/11
WO   WO-2016115483 A2 *  7/2016  ............. G10L 19/018
(Continued)

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).
(Continued)

*Primary Examiner* — Diane L Lo
*Assistant Examiner* — Abusayeed M Haque

(57) ABSTRACT

A communication device generates a legacy portion of a physical layer (PHY) preamble of a PHY data unit. The legacy portion includes a plurality of legacy training fields and a legacy signal field that indicates a duration of the PHY data unit. The communication device generates a non-legacy portion of the PHY preamble to include a multi-bit signal field header to indicate at least one of i) a particular wireless communication protocol from among the multiple wireless communication protocols, and ii) a particular version of the particular wireless communication protocol. The communication device generates the non-legacy portion of the PHY preamble to also include a non-legacy signal field having a field format that conforms to the at least one of the i)
(Continued)

particular wireless communication protocol and ii) the particular version of the particular wireless communication protocol.

22 Claims, 6 Drawing Sheets

Related U.S. Application Data

(60) Provisional application No. 62/775,232, filed on Dec. 4, 2018.

(56) References Cited

U.S. PATENT DOCUMENTS

| | | | |
|---|---|---|---|
| 9,736,724 B2* | 8/2017 | Zhang | H04W 28/06 |
| 9,818,136 B1* | 11/2017 | Hoffberg | G07F 17/32 |
| 10,181,966 B1 | 1/2019 | Sun et al. | |
| 10,212,759 B2 | 2/2019 | Zhang | |
| 10,218,822 B2 | 2/2019 | Zhang et al. | |
| 10,291,752 B2 | 5/2019 | Zhang et al. | |
| 10,382,598 B1 | 8/2019 | Zhang et al. | |
| 10,389,562 B2 | 8/2019 | Zhang et al. | |
| 10,524,231 B2* | 12/2019 | Kim | H04W 72/0446 |
| 11,374,683 B1 | 6/2022 | Ram et al. | |
| 11,477,844 B2* | 10/2022 | Son | H04W 74/0808 |
| 2011/0069707 A1* | 3/2011 | Roh | H04L 27/2071 370/392 |
| 2012/0139460 A1* | 6/2012 | Senkou | H02P 21/20 318/400.04 |
| 2015/0146806 A1* | 5/2015 | Terry | H04L 27/2626 375/260 |
| 2015/0199781 A1 | 7/2015 | Kim | |
| 2015/0340045 A1* | 11/2015 | Hardwick | G10L 19/018 704/205 |
| 2016/0156750 A1* | 6/2016 | Zhang | H04L 27/2603 370/338 |
| 2017/0150493 A1 | 5/2017 | Seok | |
| 2017/0325251 A1* | 11/2017 | Sadek | H04W 72/1231 |
| 2018/0054762 A1* | 2/2018 | Kadous | H04W 16/16 |
| 2018/0192381 A1* | 7/2018 | Kwon | H04W 4/80 |
| 2019/0029039 A1 | 1/2019 | Ko | |
| 2019/0059062 A1* | 2/2019 | Mulligan, IV | H04W 52/228 |
| 2019/0173710 A1* | 6/2019 | Cao | H04L 27/2627 |
| 2019/0190757 A1 | 6/2019 | Huang | |
| 2019/0229968 A1* | 7/2019 | Huang | H04L 1/0041 |
| 2020/0272567 A1* | 8/2020 | Gans | G06F 12/0862 |
| 2021/0045151 A1* | 2/2021 | Chen | H04W 74/002 |
| 2021/0160889 A1 | 5/2021 | Yang | |
| 2021/0266098 A1* | 8/2021 | Cao | H04L 1/0069 |
| 2021/0289501 A1* | 9/2021 | Xin | H04W 72/042 |
| 2021/0352053 A1* | 11/2021 | Melodia | H04L 63/1475 |
| 2021/0360465 A1* | 11/2021 | Henry | H04L 63/162 |
| 2022/0140942 A1* | 5/2022 | Vermani | H04L 27/2603 370/329 |
| 2022/0150025 A1* | 5/2022 | Tian | H04W 28/06 |
| 2022/0188013 A1* | 6/2022 | Woo | G11C 7/1057 |
| 2022/0337343 A1* | 10/2022 | Noh | H04L 1/0013 |

FOREIGN PATENT DOCUMENTS

| | | | | |
|---|---|---|---|---|
| WO | WO-2018084900 A1 * | 5/2018 | | H04L 1/0025 |
| WO | WO-2018164380 A1 * | 9/2018 | | H04L 27/0025 |
| WO | WO-2019074249 A1 * | 4/2019 | | H04L 27/04 |
| WO | WO-2020027802 A1 * | 2/2020 | | H04L 27/0006 |
| WO | WO-2022026397 A1 * | 2/2022 | | |
| WO | WO-2022045080 A1 * | 3/2022 | | |

OTHER PUBLICATIONS

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std P802.11-REVmc™/D8.0, (Revision of IEEE Std 802.11 ™—2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, *The Institute of Electrical and Electronics Engineers, Inc.*, 3774 pages (Aug. 2016).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

Chun et al., "Legacy Support on HEW frame structure," doc: IEEE 11-13/1057r0, *The Institute of Electrical and Electronics Engineers, Inc.*, pp. 1-8 (Sep. 2013).

Seok et al., "HEW PPDU Format for Supporting MIMO-OFDMA," IEEE 802.11-14/1210r0, 16 pages, (Sep. 14, 2014).

* cited by examiner

FIG. 3

| Packet Type 304 | BW 308 | MCS 312 | Nss 316 | DCM 320 | Preamble Duration 324 | Packet Duration 328 | Tail Bits 332 |
|---|---|---|---|---|---|---|---|
| x | 3 | 3 or 4 | 2 or 3 | 1 | 4 | y | 6 |

Bits:

← 300

PHYSICAL LAYER PREAMBLE FOR WIRELESS LOCAL AREA NETWORKS

CROSS REFERENCES TO RELATED APPLICATIONS

The present application is a continuation of U.S. application Ser. No. 16/703,352, entitled "Physical Layer Preamble for Wireless Local Area Networks," filed on Dec. 4, 2019, which claims the benefit of U.S. Provisional Patent Application No. 62/775,232, entitled "EHT Packet Format Designs: Masking & CRC Generation," filed on Dec. 4, 2018. Both of the applications referenced above are incorporated herein by reference in their entireties.

FIELD OF TECHNOLOGY

The present disclosure relates generally to wireless communication systems, and more particularly to media access control for transmission and reception over multiple communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. A goal of the IEEE 802.11 Standards has been to ensure backward compatibility with at least some previous versions of the standard so that current devices and legacy devices can interoperate. For example, some recent iterations of the IEEE 802.11 Standard define a packet format that begins with a legacy portion of a physical layer (PHY) preamble followed by a non-legacy portion of the PHY preamble. The legacy portion of the PHY preamble corresponds to a PHY preamble defined by the IEEE 802.11a Standard, and allows legacy devices to detect the packet and determine a duration of the packet. Even though the legacy devices will not be able decode the remainder of the packet, the legacy devices can determine the duration of the packet and will refrain from attempting to transmit until transmission of the packet is completed, thus avoiding interfering with the packet.

Work is now underway on a new iteration of the IEEE 802.11 Standard, which is referred to as the IEEE 802.11be Standard, or the Extremely High Throughput (EHT) standard. The PHY preamble of EHT packets should be backward compatible with at least some previous versions of the standard so that EHT devices and legacy devices can interoperate. Additionally, the EHT standard will likely permit different PHY transmission modes, such as a single user transmission mode, a multi-user transmission mode, an extended range transmission mode, etc., and thus the PHY preamble of EHT packets should be designed to signal the transmission mode of an EHT packet so that a receiver can appropriately process the EHT packet according to the particular transmission mode used for the EHT packet.

SUMMARY

In an embodiment, a method for communicating in a wireless communication network includes: generating, at a communication device, a legacy portion of a physical layer (PHY) preamble of a PHY data unit, the legacy portion including a plurality of legacy training fields and a legacy signal field that indicates a duration of the PHY data unit; and generating, at the communication device, a non-legacy portion of the PHY preamble. Generating the non-legacy portion of the PHY preamble comprises: generating a multi-bit signal field header to include a value selected from a plurality of values that correspond to at least one of i) multiple wireless communication protocols, and ii) multiple versions of one wireless communication protocol, wherein the value selected from the plurality of values indicates at least one of i) a particular wireless communication protocol from among the multiple wireless communication protocols, and ii) a particular version of the particular wireless communication protocol; generating a non-legacy signal field having a field format that conforms to the at least one of the i) particular wireless communication protocol and ii) the particular version of the particular wireless communication protocol, comprising generating the non-legacy signal field to include: i) the multi-bit signal field header as a subfield of the non-legacy signal field and as a first set of consecutive bits in a beginning portion of the non-legacy signal field so that no other bits of the non-legacy signal field precede the multi-bit signal field header, and ii) other subfields that follow the multi-bit signal field header, the other subfields having PHY information regarding the PHY data unit; and generating one or more non-legacy training fields. The method further includes transmitting, by the communication device, the PHY data unit.

In another embodiment, a communication device for communicating in a wireless communication network comprises a wireless network interface device having one or more integrated circuit (IC) devices. The one or more IC devices are configured to: generate a legacy portion of a physical layer (PHY) preamble of a PHY data unit, the legacy portion including a plurality of legacy training fields and a legacy signal field that indicates a duration of the PHY data unit; and generate a non-legacy portion of the PHY preamble. Generating the non-legacy portion of the PHY preamble includes: generating a multi-bit signal field header to include a value selected from a plurality of values that correspond to at least one of i) multiple wireless communication protocols, and ii) multiple versions of one wireless communication protocol, wherein the value selected from the plurality of values indicates at least one of i) a particular wireless communication protocol from among the multiple wireless communication protocols, and ii) a particular version of the particular wireless communication protocol; generating a non-legacy signal field having a field format that conforms to the at least one of the i) particular wireless communication protocol and ii) the particular version of the particular wireless communication protocol, comprising generating the non-legacy signal field to include: i) the multi-bit signal field header as a subfield of the non-legacy signal field and as a first set of consecutive bits in a beginning portion of the non-legacy signal field so that no other bits of the non-legacy signal field precede the multi-bit signal field header, and ii) other subfields that follow the multi-bit signal field header, the other subfields having PHY information regarding the PHY data unit; and generating one or more non-legacy training fields. The wireless network interface device further comprises one or more transceivers implemented on the one or more IC devices, the one or more transceivers configured to transmit the PHY data unit.

BRIEF DESCRIPTION OF THE DRAWINGS

FIG. 3 is a diagram of an example signal field header included in the PHY data unit of FIG. 2, according to an embodiment.

DETAILED DESCRIPTION

In various embodiments described below, wireless communication devices in a wireless local area network (WLAN) exchange packets having different packet types defined by a wireless communication protocol. The different packet types correspond to different packet formats. For example, in some embodiments, the different packet types correspond to different formats of a signal field in a physical layer (PHY) preamble of a packet. To assist receivers in processing packets of different packet types, the PHY preamble of a packet includes a signal field header that includes a multi-bit signal field header to indicate a packet type of the packet from among a plurality of packet types defined by the wireless communication protocol.

In some embodiments, the PHY preamble of packets defined by the wireless communication protocol (sometimes referred to herein as a "non-legacy protocol") is backward compatible with one or more legacy wireless communication protocols (sometimes referred to herein as a "legacy protocols") so that devices that operate according to the non-legacy protocol can interoperate with legacy devices that operate according to one or more legacy protocols. To facilitate interoperability, the PHY preamble defined by the non-legacy protocol is formatted so that a device that conforms to the non-legacy protocol can quickly determine that a packet conforms to the non-legacy protocol rather than one of the legacy protocols.

Figure 1:
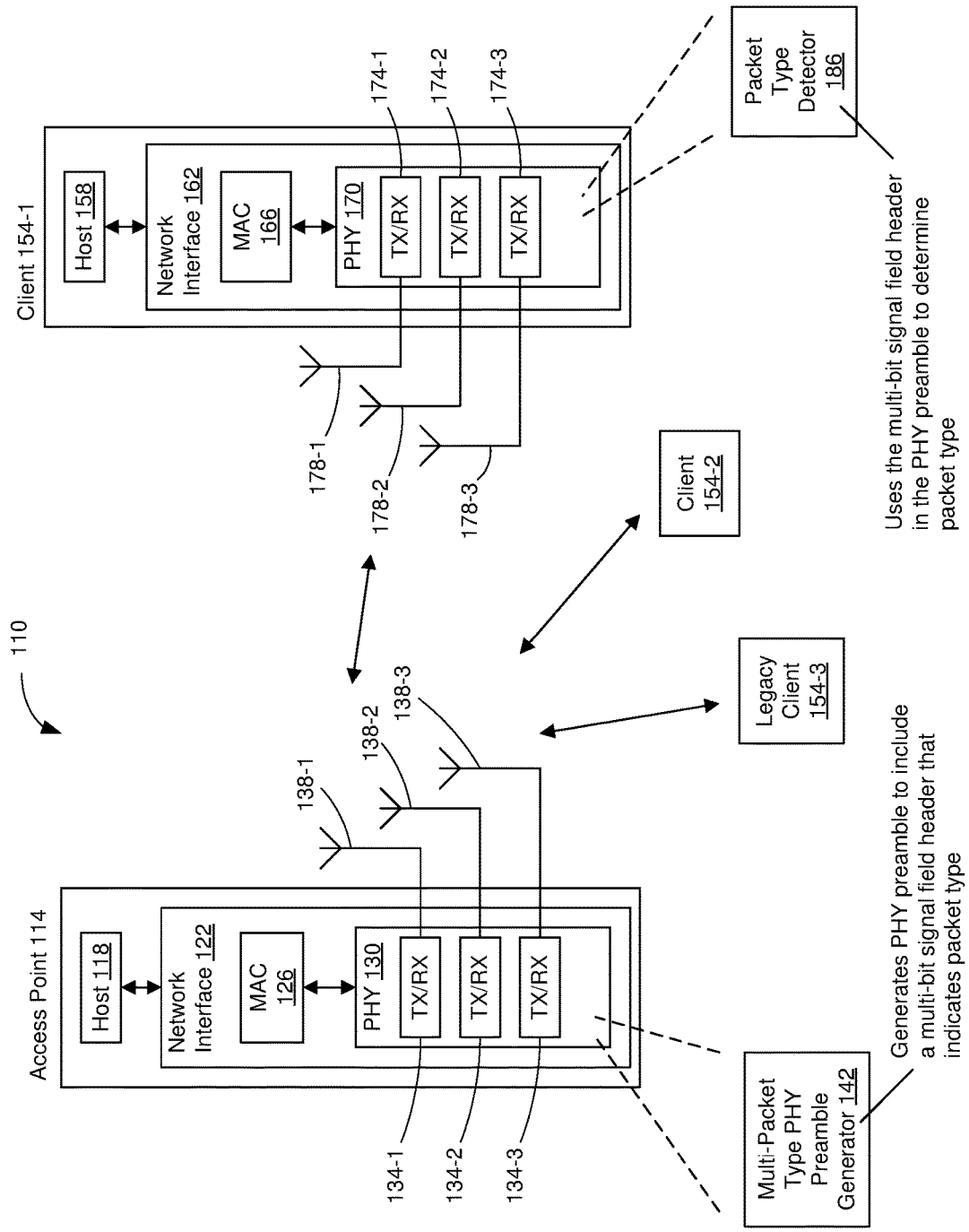
FIG. 1 is a block diagram of an example wireless local area network (WLAN) that communicates using packets of different packet types that correspond to different physical layer (PHY) formats, where a multi-bit signal field header in a PHY preamble of a packet indicates the packet type of the packet, according to an embodiment.

FIG. 1 is a block diagram of an example WLAN 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130, according to some embodiments. The PHY processor 130 is configured to receive MAC layer data units from the MAC processor 126 and encapsulate the MAC layer data units to generate PHY data units such as PHY protocol data units (PPDUs) for transmission via the antennas 138, according to some embodiments. Similarly, the PHY processor 130 is configured to receive PHY data units that were received via the antennas 138, and extract MAC layer data units encapsulated within the PHY data units, according to some embodiments. The PHY processor 130 provides the extracted MAC layer data units to the MAC processor 126, which processes the MAC layer data units, according to some embodiments.

PHY data units are sometimes referred to herein as "packets", and MAC layer data units are sometimes referred to herein as "frames".

In connection with generating one or more RF signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1 for purposes of brevity.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The PHY processor 130 includes a multi-packet type PHY preamble generator 142 that is configured to generate PHY preambles for packets of different packet types. The different packet types correspond to different PHY formats of packets. For example, in an embodiment, the different PHY formats correspond to different formats of a PHY preamble of packets. In an embodiment, the PHY preambles of packets includes a multi-bit signal field header, and the multi-packet type PHY preamble generator 142 generates the multi-bit signal field header in a PHY preamble of a packet to indicate the packet type of the packet.

In some embodiments, the multi-packet type PHY preamble generator 142 preamble is also configured to generate the PHY preamble of a packet to signal to devices that conform to a non-legacy protocol that the packet conforms to the non-legacy protocol rather than a legacy protocol.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170, according to some embodiments. The PHY processor 170 is configured to receive MAC layer data units from the MAC processor 166 and encapsulate the MAC layer data units to generate PHY data units such as PPDUs for transmission via the antennas 178, according to some embodiments. Similarly, the PHY processor 170 is configured to receive PHY data units that were received via the antennas 178, and extract MAC layer data units encapsulated within the PHY data units, according to some embodiments. The PHY processor 170 provides the extracted MAC layer data units to the MAC processor 166, which processes the MAC layer data units, according to some embodiments.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 1 for purposes of brevity.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor (not shown) configured to execute machine readable instructions stored in a memory device (not shown) such as a RAM, a ROM, a flash memory, etc. In an embodiment, the MAC processor 166 includes a hardware state machine (not shown).

The PHY processor 170 includes a packet type detector 186 that is configured to analyze a PHY preamble of a packet to determine a packet type of the packet from among a plurality of different packet types. The different packet types correspond to different PHY formats of packets. For example, in an embodiment, the different PHY formats correspond to different formats of a PHY preamble of packets. In an embodiment, the PHY preambles of packets includes a multi-bit signal field header, and the packet type detector 186 is configured to analyze the multi-bit signal field header in a PHY preamble of a packet to determine a packet type of the packet.

In some embodiments, the PHY preamble of a packet is also configured to signal to devices that conform to a non-legacy protocol that the packet conforms to the non-legacy protocol rather than a legacy protocol, and the packet type detector 186 (or another component of the PHY processor 170 (not shown)) is configured to analyze the PHY preamble of the packet to determine whether the packet conforms to the non-legacy protocol rather than a legacy protocol.

In some embodiments, the PHY processor 170 of the client station 154-1 also includes a multi-packet type PHY preamble generator (not shown) the same as or similar to the multi-packet type PHY preamble generator 142 of the AP 114. In some embodiments, the PHY processor 130 of the AP 114 also includes a packet type detector (not shown) the same as or similar to the packet type detector 186 of the client station 154-1.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
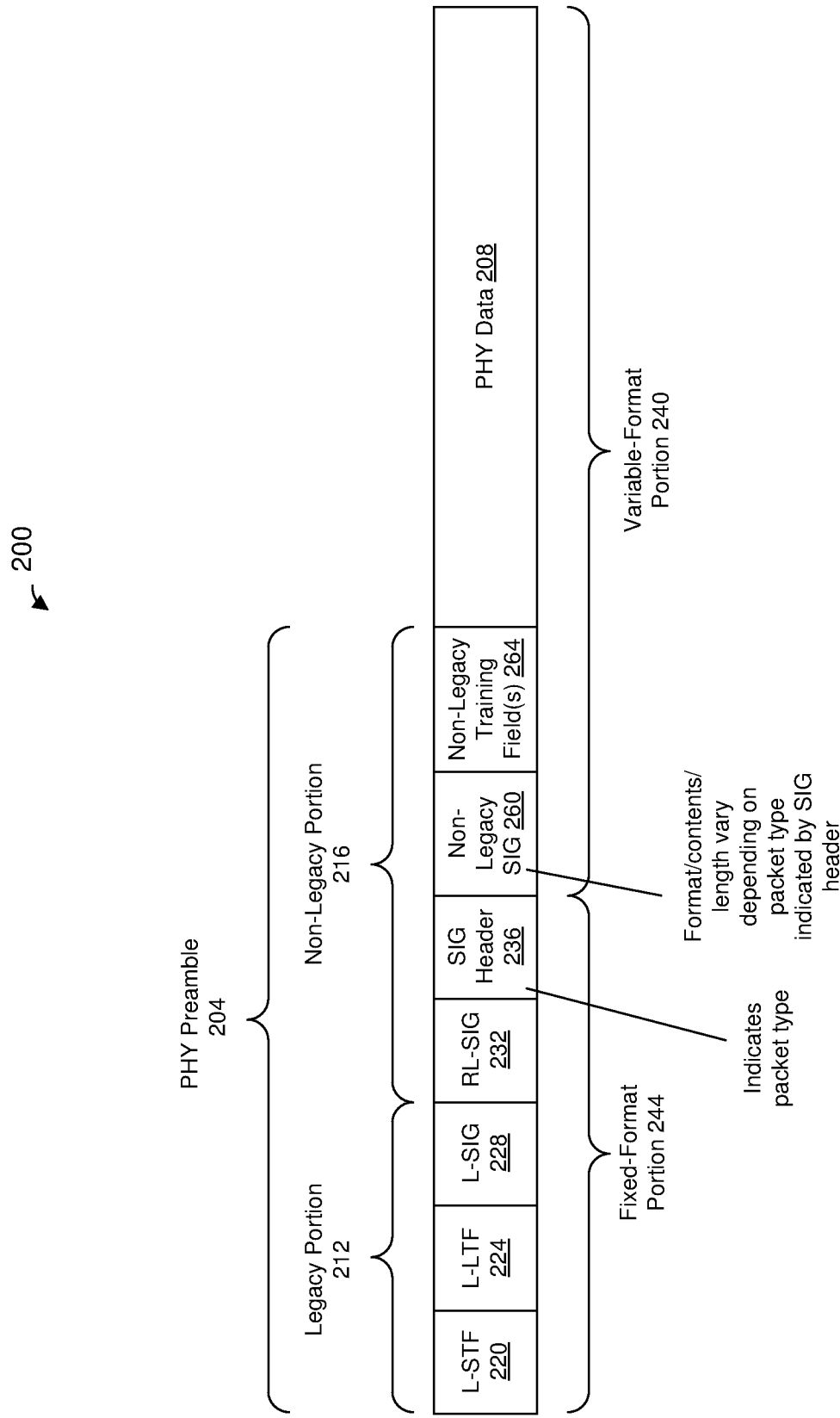
FIG. 2 is a block diagram of an example physical layer (PHY) data unit transmitted by communication devices in the WLAN of FIG. 1, according to an embodiment.

FIG. 2 is a diagram of an example PPDU 200 that the network interface device 122 (FIG. 1) is configured to generate and transmit to one or more client stations 154 (e.g., the client station 154-1), according to an embodiment. If the PPDU 200 is transmitted by a client station 154, for example, the network interface device 122 (FIG. 1) is also configured to receive and process the PPDU 200, according to an embodiment.

The network interface device 162 (FIG. 1) is also be configured to generate and transmit the PPDU 200 to the AP 114, according to an embodiment. If the PPDU 200 is transmitted by the AP 114, the network interface device 162 (FIG. 1) is also configured to receive and process the PPDU 200, according to an embodiment.

The PPDU 200 may occupy a 20 MHz bandwidth or another suitable bandwidth. Data units similar to the PPDU 200 occupy other suitable bandwidths that correspond to an aggregation of multiple sub-channels (e.g., each having a 20 MHz bandwidth or another suitable bandwidth), in other embodiments.

The PPDU 200 includes a PHY preamble 204 and a PHY data portion 208. In an embodiment, the multi-packet type PHY preamble generator 142 (FIG. 1) is configured to generate the PHY preamble 204.

The PHY preamble 204 includes a legacy portion 212 and a non-legacy portion 216. In an embodiment, the legacy portion 212 is configured to be processed by legacy communication devices in the WLAN 110 (i.e., communication devices that operate according to a legacy protocol), enabling the legacy communication devices to detect the PPDU 200 and to obtain PHY information corresponding to the PPDU 200, such as a duration of the PPDU 200. The PHY data portion 208 may include a single MPDU, or may include an aggregated MPDU (A-MPDU) comprising of a plurality of MPDUs. In some embodiments, the PHY data portion 208 is omitted, such as for null data packets (NDPs).

The legacy portion 212 of the PHY preamble 204 includes a legacy short training field (L-STF) 220, a legacy long training field (L-LTF) 224, and a legacy signal field (L-SIG) 228. The L-STF 220 includes one or more training fields that are configured to permit a wireless receiver to perform one or more functions such as i) packet detection, ii) initial synchronization, and iii) automatic gain control (AGC) adjustment. In an embodiment, the L-LTF 224 includes one or more training signals that are configured to permit the wireless receiver to perform one or more functions such as i) channel estimation and ii) fine synchronization. The contents of the L-STF 220 and the L-LTF 224 are defined by a legacy protocol and are the same for every packet.

The L-SIG 228 includes PHY information, such as i) a rate subfield, and ii) a length subfield. Contents of the rate subfield and the length subfield are set to indicate a duration of PPDU 200 so that legacy devices are able to at least determine a duration of the PPDU 200.

The non-legacy portion 216 of the PHY preamble 204 includes another instance of the L-SIG 228, referred to as a repeated L-SIG (RL-SIG) 232. In another embodiment, the RL-SIG 232 is omitted from the PHY preamble 204. In another embodiment, the RL-SIG 232 is replaced by another field as is discussed in more detail below.

The non-legacy portion 216 of the PHY preamble 204 also includes a signal field header (SIG header) that includes a multi-bit field that indicates a packet type of the PPDU 200 from among a plurality of different packet types. The a PHY format of a portion 240 (variable-format portion 240) that follows the SIG header 236 varies depending on the packet type of the PPDU 200 as will discussed in more detail below, according to an embodiment. On the other hand, a PHY format of a portion 244 (fixed-format portion 240) that includes the SIG header 236 is constant and does not vary with the packet type of the PPDU 200, according to an embodiment.

The non-legacy portion 216 includes a non-legacy signal field 260 (non-legacy SIG 260) that generally carries PHY information regarding the PPDU 200 within subfields (not shown). In some embodiments, the format of the non-legacy SIG 260 varies depending on the packet type indicated by the SIG header 236. For example, the arrangement of subfields, the number of subfields, the length(s) of one or more subfields, etc., varies depending on the packet type indicated by the SIG header 236. As another example, a modulation and coding scheme (MCS) used for the non-legacy SIG 260 is fixed for a first packet type, whereas the MCS used for the non-legacy SIG 260 is variable for a second packet type, according to an embodiment. As another example, a number of spatial streams (Nss) used for transmitting the non-legacy SIG 260 is fixed for a first packet type (e.g., Nss is one or another suitable positive integer), whereas the Nss used for transmitting the non-legacy SIG 260 is variable for a second packet type, according to an embodiment.

As another example, at least some types of PHY information included in the non-legacy SIG 260 generally varies depending on the packet type of the PPDU 200 indicated by the SIG header 236, according to an embodiment. For instance, for one or more first packet types, the non-legacy SIG 260 includes one or more first subfields corresponding to one or more respective types of PHY information, whereas for one or more second packet types, the non-legacy SIG 260 omits the one or more first subfields corresponding to the one or more respective types of PHY information. For example, for an orthogonal frequency division multiple access-type (OFDMA-type) packet, the non-legacy SIG 260 includes one or more subfields providing frequency resource unit (RU) allocation information, whereas for a single user-type (SU-type) packet, the non-legacy SIG 260 omits the one or more subfields that provide frequency RU allocation information, in an illustrative embodiment.

As another example, a length of the non-legacy SIG 260 varies depending on the packet type of the PPDU 200 indicated by the SIG header 236, according to an embodiment. For example, a first packet type may require more PHY information to be included in the SIG header 236 as compared to a second packet type, and thus the length of the non-legacy SIG 260 is longer for the first packet type than for the second packet type.

Although the non-legacy SIG 260 is illustrated in FIG. 2 as a separate field from the SIG header 236, in another embodiment the SIG header 236 is included in a subfield of the non-legacy SIG 260.

The PHY preamble 204 also include one or more non-legacy training fields 264 that include one or more signals that are configured to permit a wireless receiver to perform functions such as AGC refinement, channel estimation for a multiple input, multiple output (MIMO) channel that employs multiple spatial streams, etc.

In some embodiments, the PHY preamble 204 is configured to signal to devices that conform to a non-legacy protocol that the packet conforms to the non-legacy protocol rather than a legacy protocol, as will be described below in more detail.

FIG. 3 is a diagram of an example SIG header 300 that is used as the SIG header 236 of the PPDU 200 of FIG. 2, according to an embodiment. In other embodiments, the SIG header 300 is used in a PPDU with a suitable format different from the PPDU 200 of FIG. 2. In other embodiments, the SIG header 236 of the PPDU 200 of FIG. 2 has a suitable format different than the SIG header 300 of FIG. 3.

The network interface device 122 (FIG. 1) is configured to generate the SIG header 300, according to an embodiment. For example, the multi-packet type PHY preamble generator 142 is configured to generate the SIG header 300. If the SIG header 300 is included in a PPDU transmitted by a client station 154, the network interface device 122 (FIG. 1) is also configured to receive and process the SIG header 300, according to an embodiment.

The network interface device 162 (FIG. 1) is also be configured to generate the SIG header 300, according to an embodiment. If the SIG header 300 is included in a PPDU transmitted by the AP 114, the network interface device 162 (FIG. 1) is also configured to receive and process the SIG header 300, according to an embodiment. For example, the packet type detector 186 is configured to receive and process the SIG header 300.

FIG. 3 illustrates example numbers of bits for various subfields of the SIG header 300, as well as an example arrangement of subfields of the SIG header 300. In other embodiments, one or more of the subfields includes another suitable number of bits, and/or the subfields are arranged in another suitable manner. In other embodiments, one or more of the subfields illustrated in FIG. 3 is omitted, and/or one or more additional subfields are included in the SIG header 300.

The SIG header 300 includes a multi-bit packet type subfield 304 that indicates a packet type of the PPDU that includes the SIG header 300, the packet type from a plurality of packet types defined by a wireless communication protocol. The multi-bit packet type subfield 304 consists of x bits, where x is a suitable positive integer greater than one. Thus, the multi-bit packet type subfield 304 is capable of signaling up to $2^x$ different packet types, according to an embodiment. In some embodiments, one or more values from among the $2^x$ possible values of (and/or one or more bits of) the multi-bit packet type subfield 304 are reserved for future use, e.g., for additional packet types to be added in the future in connection with an updated version of the wireless communication protocol and/or a new wireless communication protocol. In some embodiments, one or more values from among the $2^x$ possible values of (and/or one or more bits of) the multi-bit packet type subfield 304 are reserved for signaling additional non-legacy signal fields (or extensions to an existing non-legacy signal field) that are added for use in indicating additional PHY features.

In an embodiment, the plurality of packet types defined by the wireless communication protocol comprises any suitable combination of three or more of the following packet types: an extended range (ER) packet type that uses modulation and/or coding techniques that improve range and/or receiver sensitivity, a DCM packet type in which a PHY data portion (and optionally a non-legacy signal field that follows the SIG header 300) are transmitted using DCM, a full bandwidth multi-user (MU) packet type in which independent data is transmitted to multiple receiver devices across a full bandwidth of the PPDU using MU multiple input, multiple output (MU-MIMO) techniques, an OFDMA packet type in which independent data is transmitted to multiple receiver devices using OFDMA (and optionally MU-MIMO techniques), a carrier aggregation packet type in which different frequency portions of the PPDU are transmitted in different RF bands, a hybrid automatic repeat request (HARQ) packet type in which the PPDU is transmitted using HARQ techniques, a non-orthogonal multiple access (NOMA) packet type in which the PPDU is transmitted in a NOMA transmission that involves different allocations of power and/or codes to different devices corresponding to the NOMA transmission, a semi-orthogonal multiple access (SOMA) packet type in which the PPDU is transmitted in a SOMA transmission, a distributed MIMO (DMIMO) packet type, etc. In other embodiments, the plurality of packet types defined by the wireless communication protocol comprises one or more other suitable packet types different than the packet types listed above, such as an NDP packet type.

The SIG header 300 also includes a bandwidth subfield 308 that indicates a frequency bandwidth of the PPDU that includes the SIG header 300. In an embodiment, the bandwidth indicated by the bandwidth subfield 308 is from a suitable set of multiple bandwidths, such as a set including 20 MHz, 40 MHz, 80 MHz, a contiguous 160 MHz, and two contiguous 80 MHz bandwidth segments separated by a gap in frequency. In other embodiments, the bandwidth indicated by the bandwidth subfield 308 is from another suitable set of multiple bandwidths. In embodiments in which only one bandwidth is permitted for the PPDU that includes the SIG header 300, the bandwidth subfield 308 is omitted.

The SIG header 300 also includes an MCS subfield 312 that indicates an MCS that is used for a non-legacy signal field that follows the SIG header 300 (e.g., the non-legacy SIG 260), the MCS indicated by the MCS subfield 312 from a suitable set of multiple MCSs. In embodiments in which only one MCS is permitted for the non-legacy signal field that follows the SIG header 300, the MCS subfield 312 is omitted.

The SIG header 300 also includes an Nss subfield 316 that indicates a number of spatial streams that is used for transmitting the non-legacy signal field that follows the SIG header 300 (e.g., the non-legacy SIG 260). In embodiments in which the non-legacy signal field can only be transmitted using a single spatial stream, the Nss subfield 316 is omitted.

The SIG header 300 also includes a dual carrier modulation (DCM) subfield 320 that indicates whether the non-legacy signal field that follows the SIG header 300 (e.g., the non-legacy SIG 260) is transmitted using DCM. In embodiments in which the non-legacy signal field cannot be transmitted using DCM, or can only be transmitted using DCM, the DCM subfield 320 is omitted.

The SIG header 300 also includes a preamble duration subfield 324 that indicates a duration of the PHY preamble of the of the PPDU that includes the SIG header 300, or a duration of a signal field that follows the SIG header 300. In some embodiments (such as embodiments in which the duration of the signal field that follows the SIG header 300 is fixed for a given packet type), the preamble duration subfield 324 is omitted.

The SIG header 300 also includes a packet duration subfield 328 that indicates a duration of the PPDU that includes the SIG header 300. The packet duration subfield 328 consists of y bits, where y is a suitable positive integer greater than one. In some embodiments (such as embodiments in which the signal field that follows the SIG header 300 includes a packet duration subfield), the packet duration subfield 328 is omitted.

The SIG header 300 also includes a tail bits subfield 332 that includes tail bits for the SIG header 300. The tail bits in the tail bits subfield 332 are utilized for encoding the SIG header 300 with a convolutional error correction code, such as a binary convolutional code (BCC) or another suitable error correction code, and enable a receiver device to decode the SIG header 300 after receiving the tail bits. In some embodiments (such as embodiments in which the SIG header 300 is not encoded using an error correction code or in which the SIG header 300 is jointly encoded with the signal field that follows the SIG header 300), the tail bits subfield 332 is omitted.

Referring now to FIGS. 2 and 3, the MCS subfield 312, the preamble duration subfield 324, and/or the packet duration subfield 328 are useful, for example, for transmitting a first portion of the PHY preamble 204 (e.g., the SIG header 236) at a first data rate that corresponds to a relatively high receiver sensitivity, and transmitting a second portion of the PHY preamble 204 (e.g., the non-legacy SIG 260 and the non-legacy training field(s) 264 at a second data rate (as indicated by the MCS subfield 312), higher than the first data rate, and that corresponds to a relatively lower receiver sensitivity (e.g., as compared to the first data rate). For example, receiver devices are better able to decode the SIG header 236 at the first data rate and thus at least determine the duration of the PPDU 200 (e.g., using the packet duration subfield 328) and thus avoid interfering with the PPDU 200. At the same time, the second portion of the PHY preamble 204 is transmitted at the higher second data rate (as indicated by the MCS subfield 312), thus reducing channel overhead.

As another example, the MCS subfield 312, the preamble duration subfield 324, and/or the packet duration subfield 328 are useful, for example, for NDP packets. For instance, additional control information (as compared to control information included in NDPs used in existing IEEE 802.11 protocols) may be included in a longer non-legacy SIG 260 with a duration indicated by the preamble duration subfield 324, thus providing enhancements over NDPs used in existing IEEE 802.11 protocols.

As another example, the MCS subfield 312, the preamble duration subfield 324, and/or the packet duration subfield 328 are useful, for example, for packets that include common information for multiple receivers as well as independent information for individual receivers, such as broadcast packets or group-addressed packets. For instance, common PHY information as well as independent PHY information for individual receivers can be included in a variable length non-legacy SIG 260 with a duration indicated by the preamble duration subfield 324.

Figure 4:
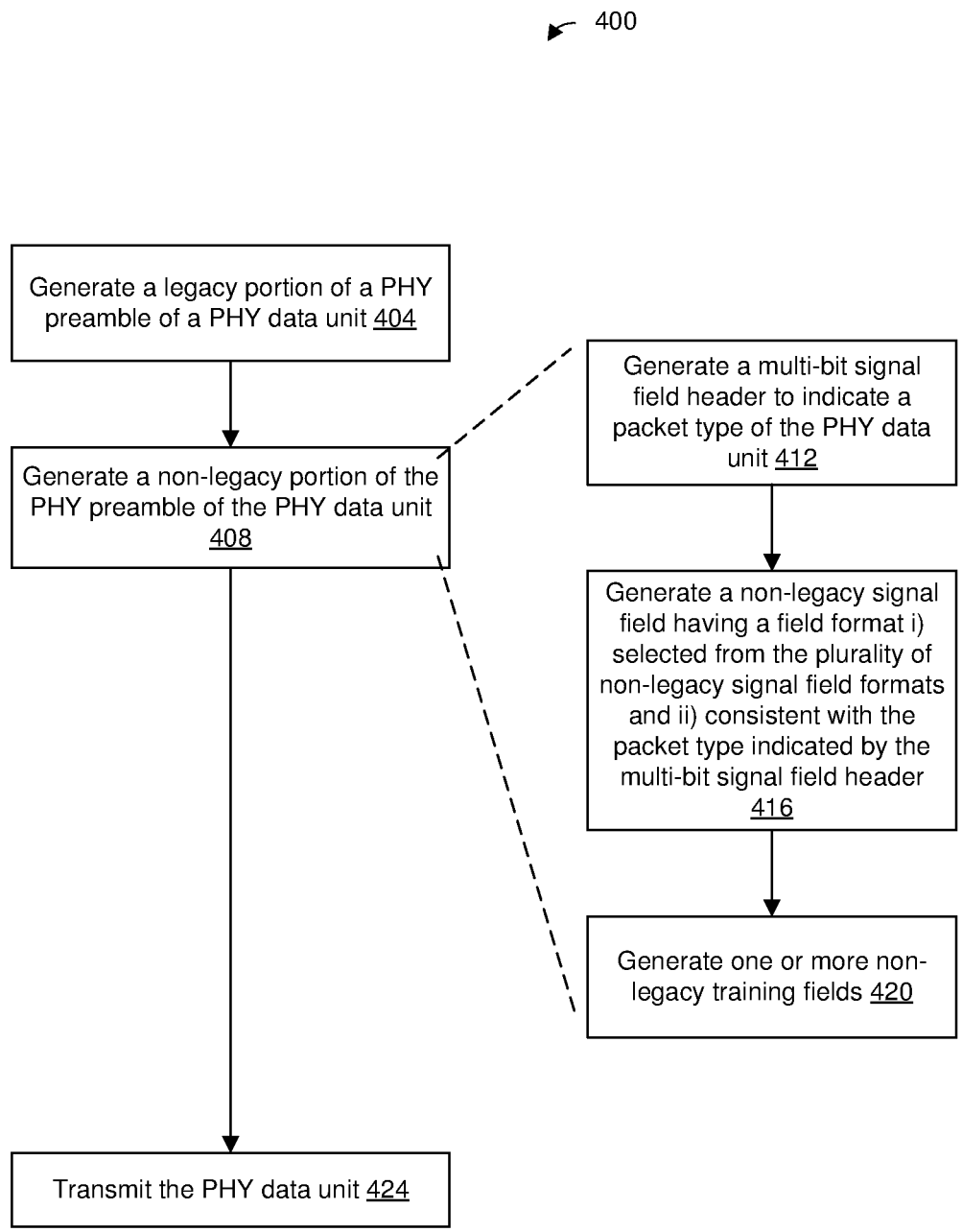
FIG. 4 is a flow diagram of an example method for generating and transmitting a PHY data unit having a signal field header such as the signal field header of the FIG. 3, according to another embodiment.

FIG. 4 is a flow diagram of an example method 400 for communicating in a wireless communication network, according to an embodiment. The method 400 is implemented in the WLAN 110 of FIG. 1, in an embodiment, and the method 400 is described with reference to FIG. 1 for explanatory purposes. In other embodiments, however, the method 400 is implemented in another suitable WLAN different than the WLAN 110.

In various embodiments, the method 400 involves generating PHY data units, PHY preamble fields, and/or PHY preamble subfields such as discussed above with reference to FIGS. 2 and 3, and the method 400 is described with reference to FIGS. 2 and 3 for explanatory purposes. In other embodiments, however, the method 400 involves generating suitable PHY data units, PHY preamble fields, and/or PHY preamble subfields different than those discussed above with reference to FIGS. 2 and 3.

In an embodiment, the network interface device 122 is configured to implement the method 400. For example, the multi-packet type PHY preamble generator 142 is configured to implement a portion of the method 400. In another embodiment, the network interface device 162 is configured to implement the method 400. In other embodiments, the method 400 is implemented by another suitable communication device, such as another suitable WLAN network interface device.

At block 404, a communication device generates (e.g., the network interface device 122 generates, the PHY processor 130 generates, the multi-packet type PHY preamble generator 142 generates, etc.) a legacy portion of a PHY preamble of a PHY data unit. In an embodiment, the legacy portion includes a plurality of legacy training fields and a legacy signal field that indicates a duration of the PHY data unit.

At block 408, the communication device generates (e.g., the network interface device 122 generates, the PHY processor 130 generates, the multi-packet type PHY preamble generator 142 generates, etc.) a non-legacy portion of the PHY preamble. Generating the non-legacy portion of the PHY preamble at block 408 includes generating (e.g., the network interface device 122 generating, the PHY processor 130 generating, the multi-packet type PHY preamble generator 142 generating, etc.), at block 412, a multi-bit signal field header to indicate a packet type of the PHY data unit from among a plurality of packet types defined by a wireless communication protocol. In an embodiment, the plurality of packet types corresponds to a plurality of non-legacy signal field formats.

Generating the non-legacy portion of the PHY preamble at block 408 also includes generating (e.g., the network interface device 122 generating, the PHY processor 130 generating, the multi-packet type PHY preamble generator 142 generating, etc.), at block 416, a non-legacy signal field having a field format i) selected from the plurality of non-legacy signal field formats and ii) consistent with the packet type indicated by the multi-bit signal field header. In an embodiment, the non-legacy signal field including PHY information regarding the PHY data unit.

Generating the non-legacy portion of the PHY preamble at block 408 also includes generating (e.g., the network interface device 122 generating, the PHY processor 130 generating, the multi-packet type PHY preamble generator 142 generating, etc.), at block 420, one or more non-legacy training fields.

In another embodiment, the plurality of non-legacy signal field formats includes i) a first field format corresponding to a first packet type from the plurality of packet types, and ii) a second field format corresponding to a second packet type from the plurality of packet types; the first field format corresponds to a first length of the non-legacy signal field and the second field format corresponds to a second length of the non-legacy signal field that is different from the first length; and generating the non-legacy signal field at block 416 comprises: generating the non-legacy signal field according to the first field format when the multi-bit signal field header is generated to indicate the first packet type, comprising generating the non-legacy signal field to have the first length, and generating the non-legacy signal field according to the second field format when the multi-bit signal field header is generated to indicate the first packet type, comprising generating the non-legacy signal field to have the second length.

In another embodiment, the plurality of non-legacy signal field formats includes i) a first field format corresponding to a first packet type from the plurality of packet types, and ii) a second field format corresponding to a second packet type from the plurality of packet types; the first field format includes a first subfield for specifying a value of a first PHY parameter regarding the PHY data unit, and the second field format does not include the first subfield, and wherein the second field format includes a second subfield for specifying a value of a second PHY parameter regarding the PHY data unit, and the first field format does not include the second subfield; and generating the non-legacy signal field at block 416 comprises: generating the non-legacy signal field according to the first field format when the multi-bit signal field header is generated to indicate the first packet type, comprising generating the non-legacy signal field to include the first subfield specifying the value of the first PHY parameter, and generating the non-legacy signal field according to the second field format when the multi-bit signal field header is generated to indicate the first packet type, comprising generating the non-legacy signal field to include the second subfield specifying the value of the second PHY parameter.

In some embodiments, the method 400 also includes generating (e.g., the network interface device 122 generating, the PHY processor 130 generating, etc.) a PHY data portion of the PHY data unit.

At block 424, the communication device transmits (e.g., the network interface device 122 transmits, the PHY processor 130 transmits, the one or more transceivers 134 transmit, etc.) the PHY data unit.

Figure 5:
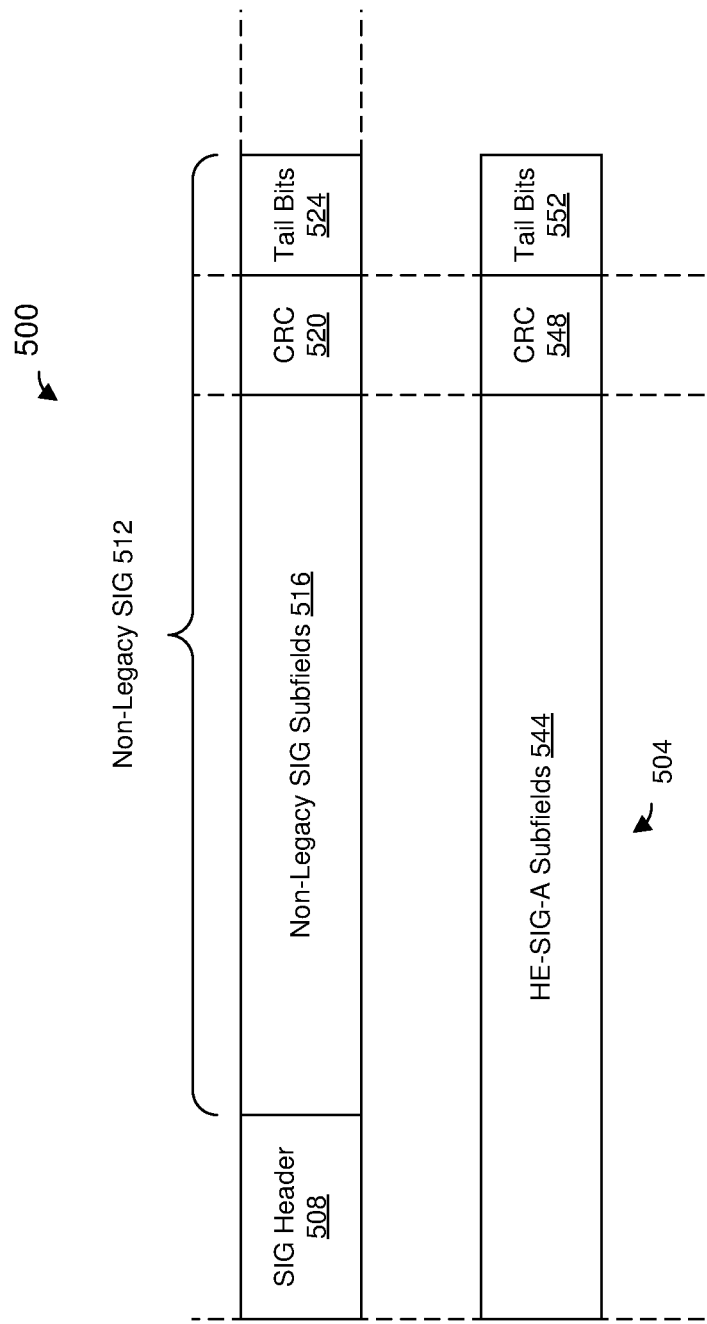
FIG. 5 is a diagram of diagram of an example portion of a PHY preamble that is included in the PHY data unit of FIG. 2, according to an embodiment, as compared with a high efficiency signal field (HE-SIG-A) defined by a current draft of the Institute for Electrical and Electronics Engineers (IEEE) 802.11ax Standard.

Referring again to FIG. 2, the PHY preamble 204 is also configured, as discussed above, to signal to a receiving device that conforms to the non-legacy protocol, that the PPDU 200 conforms to the non-legacy protocol, according to some embodiments. FIG. 5 is a diagram of an example portion 500 of a PHY preamble that is included in the PPDU 200 of FIG. 2, according to an embodiment. In other embodiments, PHY preamble portion 500 is used in a PPDU with a suitable format different from the PPDU 200 of FIG. 2. In other embodiments, the PHY preamble 204 of the PPDU 200 of FIG. 2 does not include the PHY preamble portion 500.

The network interface device 122 (FIG. 1) is configured to generate the PHY preamble portion 500, according to an embodiment. For example, the multi-packet type PHY preamble generator 142 is configured to generate the PHY preamble portion 500. If the PHY preamble portion 500 is included in a PPDU transmitted by a client station 154, the network interface device 122 (FIG. 1) is also configured to receive and process the PHY preamble portion 500, according to an embodiment.

The network interface device 162 (FIG. 1) is also be configured to generate the PHY preamble portion 500, according to an embodiment. If the PHY preamble portion 500 is included in a PPDU transmitted by the AP 114, the network interface device 162 (FIG. 1) is also configured to receive and process the PHY preamble portion 500, according to an embodiment. For example, the packet type detector 186 is configured to receive and process the PHY preamble portion 500.

In FIG. 5, the PHY preamble portion 500 is shown in comparison with a high efficiency (HE) signal field (HE-SIG-A) 504 defined by the current draft of the IEEE 802.11ax Standard.

The PHY preamble portion 500 includes a SIG header 508 and a non-legacy SIG 512. In some embodiments, the SIG header 508 and the non-legacy SIG 512 correspond to example SIG headers and non-legacy SIGs discussed above. In other embodiments, the SIG header 508 and the non-legacy SIG 512 correspond to other suitable SIG headers and non-legacy SIGs different than the SIG headers and non-legacy SIGs discussed above.

The non-legacy SIG 512 field includes a plurality of various subfields 516, a cyclic redundancy check (CRC) subfield 520, and a tail bits subfield 524.

Although the SIG header 508 is shown in FIG. 5 as being separate from the non-legacy SIG 512, in some embodiments the SIG header 508 is considered a part of the non-legacy SIG 512.

Bits of the SIG header 508 and the subfields 516 are provided to a CRC generator that applies a CRC polynomial to generate CRC bits. The generated CRC bits are included in the CRC subfield 520 for use in an error detection operation performed at a receiver.

Referring now to the HE-SIG-A 504 defined by the current draft of the IEEE 802.11ax Standard, the HE-SIG-A 504 includes a plurality of various subfields 544, a CRC subfield 548, and a tail bits subfield 552. Bits of the subfields 544 are provided to a CRC generator that applies a CRC polynomial to generate CRC bits. The generated CRC bits are included in the CRC subfield 548 for use in an error detection operation performed at a receiver.

In an embodiment, the polynomial used to generate the CRC bits in the CRC subfield 520 is the same as the polynomial used to generate the CRC bits in the CRC subfield 548. In an embodiment, a length of the SIG header 508 and the subfields 516 is the same as a length of the HE-SIG-A subfields 544. A position of CRC 520 in a bit stream starting with a beginning of the SIG header 508 is the same as a position in a bit stream starting with a beginning of the HE-SIG-A field 504.

In some embodiments, the CRC bits included in the CRC 548 are generated using a first technique, whereas the CRC bits included in the CRC 520 are generated using a second technique different than the first technique. At a receiver, the receiver generates a first CRC value for a bit stream corresponding to PHY preamble using the first technique, and ii) generates a second CRC value for the bit stream using the second technique. If the CRC field in the bit stream has a value equal to the first CRC value, the receiver determines that the packet conforms to the IEEE 802.11ax protocol; whereas if the CRC field in the bit stream has a value equal to the second CRC value, the receiver determines that the packet conforms to the non-legacy protocol.

Figure 6A:
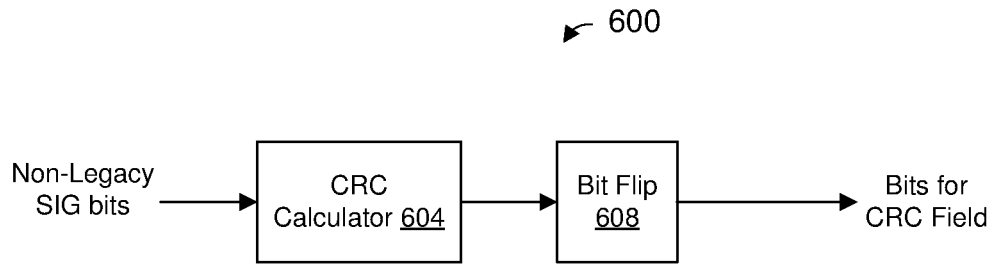
FIG. 6A is a diagram of an example cyclic redundancy check (CRC) generator for generating a CRC value to be included in a CRC subfield PHY preamble of FIG. 5, according to an embodiment.

FIG. 6A is a diagram of an example CRC generator 600 for generating a CRC value for the CRC subfield 520 of FIG. 5, according to an embodiment. The network interface device 122 (FIG. 1) includes the CRC generator 600, according to an embodiment. For example, the multi-packet type PHY preamble generator 142 includes the CRC generator 600. In another embodiment, the network interface device 162 (FIG. 1) includes the CRC generator 600, according to an embodiment.

The CRC generator 600 includes a CRC calculator 604 that is configured to apply a CRC polynomial to a bit stream corresponding to the SIG header 508 and the subfields 516 of FIG. 5. In an embodiment, the CRC polynomial applied by the CRC calculator 604 is a CRC polynomial used for generating CRC values for HE-SIG-A fields as defined by the current draft of the IEEE 802.11ax standard.

The CRC generator 600 also includes a bit flipping circuit 608 that is configured to flip a plurality of bits, at predetermined locations, in a CRC value generated by the CRC calculator 604. An output of the bit flipping circuit 608 is include in the CRC subfield 520 of FIG. 5.

Figure 6B:
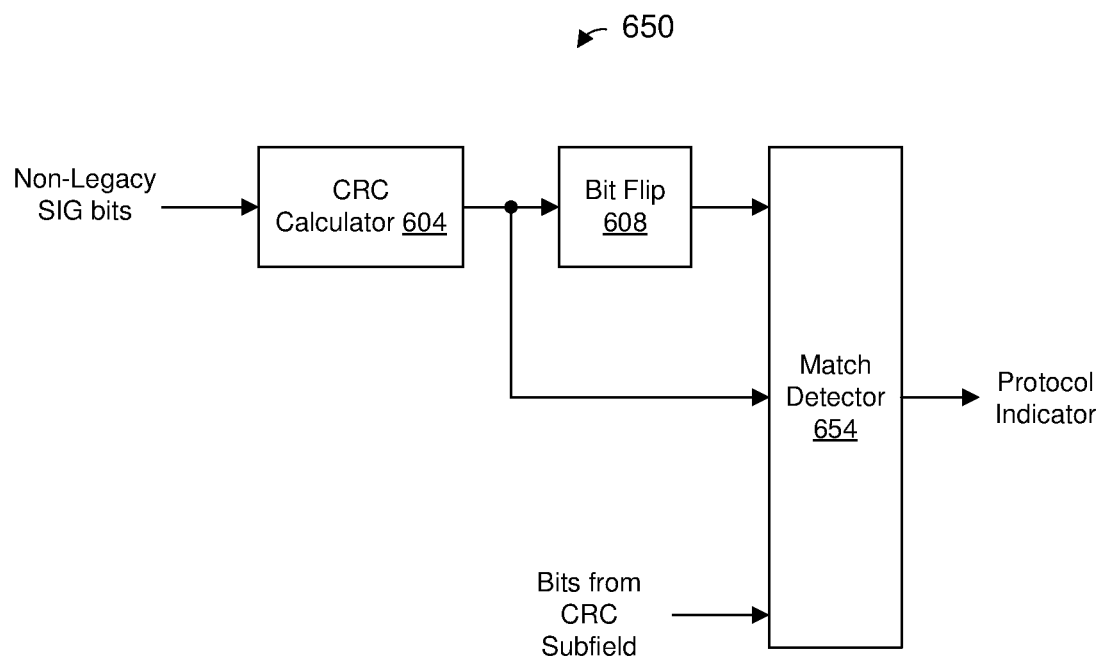
FIG. 6B is a diagram of an example protocol detector for determining a wireless communication protocol according to which a received packet corresponds, according to an embodiment.

FIG. 6B is a diagram of an example protocol detector 650 for determining a wireless communication protocol according to which a received packet corresponds, according to an embodiment. The network interface device 122 (FIG. 1) includes the protocol detector 650, according to an embodiment. In another embodiment, the network interface device 162 (FIG. 1) includes the protocol detector 650, according to an embodiment.

The protocol detector 650 includes the CRC calculator 604 of FIG. 6A, which applies the CRC polynomial to a bit stream corresponding to a PHY preamble of a received packet. The protocol detector 650 also includes the bit flipping circuit 608 of FIG. 6A, which flip a plurality of bits, at the predetermined locations, in a CRC value generated by the CRC calculator 604.

The protocol detector 650 also includes a match detector 654 that receives an output of the bit flipping circuit 608, an output of the CRC calculator 604, and bits from a CRC subfield in the received packet. The match detector 654 is configured to generate an output that indicates the received packet conforms to the non-legacy protocol when the output of the bit flipping circuit 608 matches bits from the CRC subfield in the received packet, and to generate an output that indicates the received packet conforms to the IEEE 802.11ax protocol when the output of the CRC calculator 604 matches bits from the CRC subfield in the received packet.

In another embodiment, in the CRC generator 600, the bit flipping circuit 608 is moved to operate on an input to the CRC calculator 604 so that bits are flipped at predetermined locations in the bit stream before the CRC calculator 604 operates on the bit stream. In such an embodiment, in the protocol detector 650, the bit flipping circuit 608 is moved to operate on an input to the CRC calculator 604 so that bits are flipped at predetermined locations in the bit stream before the CRC calculator 604 operates on the bit stream. In such an embodiment, the match detector 654 receives an output of the CRC calculator 604 that operated on the bit stream with bits flipped, an output of another CRC calculator 604 that operated on the bit stream without bits flipped, and bits from the CRC subfield in the received packet. The match detector 654 is configured to generate an output that indicates the received packet conforms to the non-legacy protocol when the output of the CRC calculator 604 that operated on the bit stream with bits flipped matches bits from the CRC subfield in the received packet, and to generate an output that indicates the received packet conforms to the IEEE 802.11ax protocol when the output of the CRC calculator 604 that operated on the bit stream without bits flipped matches bits from the CRC subfield in the received packet.

In another embodiment, the bit flipping circuit 608 is omitted and the CRC generator 600 uses a different CRC polynomial than used for generating CRC values for HE-SIG-A fields as defined by the current draft of the IEEE 802.11ax standard. In such an embodiment, the protocol detector 650 omits the bit flipping circuit 608, and includes a second CRC calculator that applies the CRC polynomial defined by the current draft of the IEEE 802.11ax standard. The match detector 654 is configured to generate an output that indicates the received packet conforms to the non-legacy protocol when the output of the CRC calculator 604 matches bits from the CRC subfield in the received packet, and to generate an output that indicates the received packet conforms to the IEEE 802.11ax protocol when the output of the other CRC calculator 604 that applies the CRC polynomial defined by the current draft of the IEEE 802.11ax standard matches bits from the CRC subfield in the received packet.

Referring again to FIG. 2, the IEEE 802.11ax standard defines the RL-SIG 232 as including the same bits as the L-SIG 228. In some embodiments, to signal that the PPDU 200 conforms to the non-legacy protocol, the RL-SIG 232 is modified (e.g., the PHY processor 130 modifies the RL-SIG 232, the PHY processor 170 modifies the RL-SIG 232, etc.) with respect to the L-SIG 228 in a predetermined way so that devices that conform to the IEEE 802.11ax standard will determine that the RL-SIG 232 does not match the L-SIG 228, whereas non-legacy devices reverse the predetermined modification applied to the RL-SIG 232 and then compare the reverse-modified RL-SIG 232 to the L-SIG 228 to determine whether the reverse-modified RL-SIG 232 matches the L-SIG 228. If the non-legacy receiver determines (e.g., the PHY processor 130 determines, the PHY processor 170 determines, etc.) that the reverse-modified RL-SIG 232 matches the L-SIG 228, the receiver determines (e.g., the PHY processor 130 determines, the PHY processor 170 determines, etc.) that the PPDU 200 conforms to the non-legacy protocol, according to an embodiment. In some embodiments, modification of the RL-SIG 232 with respect to the L-SIG 228 in the predetermined way is combined with one or more of the techniques described above with reference to FIGS. 2-6B. In other embodiments, modification of the L-LTF 224 in the predetermined way is not used with any of the techniques described above with reference to FIGS. 2-6B.

In an embodiment, the RL-SIG 232 is generated (e.g., the PHY processor 130 generates the RL-SIG 232, the PHY processor 170 generates the RL-SIG 232, etc.) by applying a predetermined bit mask to bits of the L-SIG 228. For example, the RL-SIG 232 is generated (e.g., the PHY processor 130 generates the RL-SIG 232, the PHY processor 170 generates the RL-SIG 232, etc.) by XORing a predetermined bit mask with bits of the L-SIG 228, wherein at least some of the bit mask are ones. In an embodiment, different bit masks are used additionally to signal different packet types or packet type groups. The receiver modifies (e.g., the PHY processor 130 modifies, the PHY processor 170 modifies, etc.) the L-SIG 228 in a received packet by applying the bit mask to the L-SIG 228, and compares the modified L-SIG 228 with the RL-SIG 232; if the modified L-SIG 228 matches the RL-SIG 232, the receiver determines (e.g., the PHY processor 130 determines, the PHY processor 170 determines, etc.) that the PPDU 200 conforms to the non-legacy protocol, according to an embodiment. In another embodiment, the receiver reverses (e.g., the PHY processor 130 reverses, the PHY processor 170 reverses, etc.) the bit mask applied to the RL-SIG 232; if the L-SIG 228 matches the reverse bit-masked RL-SIG 232, the receiver determines (e.g., the PHY processor 130 determines, the PHY processor 170 determines, etc.) that the PPDU 200 conforms to the non-legacy protocol, according to an embodiment.

In another embodiment, the RL-SIG 232 is generated (e.g., the PHY processor 130 generates the RL-SIG 232, the PHY processor 170 generates the RL-SIG 232, etc.), additionally or alternatively, by interleaving bits of the L-SIG 228 according to a predetermined interleaving technique. The receiver interleaves (e.g., the PHY processor 130 interleaves, the PHY processor 170 interleaves, etc.) the L-SIG 228 in a received PPDU 200 according to the predetermined interleaving technique, and compares the interleaved L-SIG 228 with the RL-SIG 232; if the interleaved L-SIG 228 matches the RL-SIG 232, the receiver determines (e.g., the PHY processor 130 determines, the PHY processor 170 determines, etc.) that the PPDU 200 conforms to the non-legacy protocol, according to an embodiment. In another embodiment, the receiver applies deinterleaving (which corresponds to the predetermined interleaving technique) to the RL-SIG 232 (e.g., the PHY processor 130 deinterleaves, the PHY processor 170 deinterleaves, etc.); if the L-SIG 228 matches the deinterleaved RL-SIG 232, the receiver determines (e.g., the PHY processor 130 determines, the PHY processor 170 determines, etc.) that the PPDU 200 conforms to the non-legacy protocol, according to an embodiment.

In another embodiment, the RL-SIG 232 is generated (e.g., the PHY processor 130 generates the RL-SIG 232, the PHY processor 170 generates the RL-SIG 232, etc.) by applying predetermined phase rotations to predetermined OFDM tones of an OFDM symbol corresponding to the L-SIG 228. In an embodiment, different phase rotation patterns are used additionally to signal different packet types or packet type groups. The receiver modifies (e.g., the PHY processor 130 modifies, the PHY processor 170 modifies, etc.) the L-SIG 228 in a received packet by applying the predetermined phase rotations to predetermined OFDM tones of an OFDM symbol corresponding to the L-SIG 228, and compares the modified OFDM symbol of the L-SIG 228 with an OFDM symbol of RL-SIG 232; if the modified OFDM symbol of the L-SIG 228 matches the RL-SIG 232, the receiver determines (e.g., the PHY processor 130 determines, the PHY processor 170 determines, etc.) that the PPDU 200 conforms to the non-legacy protocol, according to an embodiment. In another embodiment, the receiver reverses (e.g., the PHY processor 130 reverses, the PHY processor 170 reverses, etc.) the predetermined phase rotations to predetermined OFDM tones of an OFDM symbol corresponding to the RL-SIG 232; if the OFDM symbol of the L-SIG 228 matches the modified OFDM symbol of the RL-SIG 232, the receiver determines (e.g., the PHY processor 130 determines, the PHY processor 170 determines, etc.) that the PPDU 200 conforms to the non-legacy protocol, according to an embodiment.

In another embodiment, the RL-SIG 232 is generated (e.g., the PHY processor 130 generates the RL-SIG 232, the PHY processor 170 generates the RL-SIG 232, etc.) by i) applying phase rotations to the L-SIG 228 such as described above, and ii) interleaving bits of the L-SIG 228 such as described above.

In some embodiments, to signal that the PPDU 200 conforms to the non-legacy protocol, the L-LTF 224 is modified (e.g., the PHY processor 130 modifies the L-LTF 224, the PHY processor 170 modifies the L-LTF 224, etc.) with respect to the L-LTF defined in legacy IEEE 802.11 protocols in a predetermined way so that devices that conform to the non-legacy protocol can detect the modification. In some embodiments, modification of the L-LTF 224 in the predetermined way is combined with one or more of the techniques described above with reference to FIGS. 2-6B. In other embodiments, modification of the L-LTF 224 in the predetermined way is not used with any of the techniques described above with reference to FIGS. 2-6B.

As an example, the L-LTF 224 is generated (e.g., the PHY processor 130 generates the L-LTF 224, the PHY processor 170 generates the L-LTF 224, etc.) by applying predetermined phase rotations to predetermined OFDM tones of an OFDM symbol corresponding to the L-LTF defined by the legacy IEEE 802.11 protocols. In an embodiment, the predetermined phase rotations are configured to, when a receive device generate a channel estimate using the L-LTF, cause the channel estimate to have abrupt phase discontinuities at predetermined frequencies. In some embodiments in which the L-LTF 224 is modified with respect to the L-LTF defined in the legacy IEEE 802.11 protocols, the RL-SIG 232 is omitted from the PHY preamble 204.

A receiver that receives the modified L-LTF 224 in a received packet generates (e.g., the PHY processor 130 generates, the PHY processor 170 generates, etc.) a channel estimate using the modified L-LTF 224; if the receiver determines (e.g., the PHY processor 130 determines, the PHY processor 170 determines, etc.) that the channel estimate has abrupt phase discontinuities at the predetermined frequencies, the receiver determines (e.g., the PHY processor 130 determines, the PHY processor 170 determines, etc.) that the PPDU 200 conforms to the non-legacy protocol, according to an embodiment.

In some embodiments in which the L-LTF 224 is generated by applying predetermined phase rotations such as described above, the predetermined phase rotations are also applied to the L-SIG 228. In some embodiments in which the L-LTF 224 is generated by applying predetermined phase rotations such as described above, the predetermined phase rotations are also applied to the L-STF 220.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:
    generating, at a communication device, a legacy portion of a physical layer (PHY) preamble of a PHY data unit, the legacy portion including a plurality of legacy training fields and a legacy signal field that indicates a duration of the PHY data unit;
    generating, at the communication device, a non-legacy portion of the PHY preamble, including:
        generating a multi-bit signal field header to include a value selected from a plurality of values that correspond to at least one of i) multiple wireless communication protocols, and ii) multiple versions of one wireless communication protocol, wherein the value selected from the plurality of values indicates at least one of i) a particular wireless communication protocol from among the multiple wireless communication protocols, and ii) a particular version of the particular wireless communication protocol,
        generating a non-legacy signal field having a field format that conforms to the at least one of the i) particular wireless communication protocol and ii) the particular version of the particular wireless communication protocol, comprising generating the non-legacy signal field to include: i) the multi-bit signal field header as a subfield of the non-legacy signal field and as a first set of consecutive bits in a beginning portion of the non-legacy signal field so that no other bits of the non-legacy signal field precede the multi-bit signal field header, and ii) other subfields that follow the multi-bit signal field header, the other subfields having PHY information regarding the PHY data unit, and
        generating one or more non-legacy training fields; and
    transmitting, by the communication device, the PHY data unit.

2. The method of claim 1, wherein:
    the at least one of the i) particular wireless communication protocol and ii) the particular version of the particular wireless communication protocol defines a plurality of non-legacy signal field formats and a plurality of packet types;
    the plurality of non-legacy signal field formats includes i) a first field format corresponding to a first packet type from the plurality of packet types, and ii) a second field format corresponding to a second packet type from the plurality of packet types, wherein the first field format corresponds to a first length of the non-legacy signal field and the second field format corresponds to a second length of the non-legacy signal field that is different from the first length; and
    generating the non-legacy signal field comprises:
        generating the non-legacy signal field according to the first field format when the multi-bit signal field header is generated to indicate the first packet type, comprising generating the non-legacy signal field to have the first length, and
        generating the non-legacy signal field according to the second field format when the multi-bit signal field header is generated to indicate the second packet type, comprising generating the non-legacy signal field to have the second length.

3. The method of claim 1, wherein:
    the at least one of the i) particular wireless communication protocol and ii) the particular version of the particular wireless communication protocol defines a plurality of non-legacy signal field formats and a plurality of packet types;
    the plurality of non-legacy signal field formats includes i) a first field format corresponding to a first packet type from the plurality of packet types, and ii) a second field format corresponding to a second packet type from the plurality of packet types, wherein the first field format includes a first subfield for specifying a value of a first PHY parameter regarding the PHY data unit, and the second field format does not include the first subfield, and wherein the second field format includes a second subfield for specifying a value of a second PHY parameter regarding the PHY data unit, and the first field format does not include the second subfield; and
    generating the non-legacy signal field comprises:
        generating the non-legacy signal field according to the first field format when the multi-bit signal field header is generated to indicate the first packet type, comprising generating the non-legacy signal field to include the first subfield specifying the value of the first PHY parameter, and
        generating the non-legacy signal field according to the second field format when the multi-bit signal field header is generated to indicate the second packet type, comprising generating the non-legacy signal field to include the second subfield specifying the value of the second PHY parameter.

4. The method of claim 1, wherein:
    the at least one of the i) particular wireless communication protocol and ii) the particular version of the particular wireless communication protocol defines a plurality of packet types;
    generating the multi-bit signal field header comprises:
        generating a multi-bit first subfield that indicates a packet type of the PHY data unit selected from the plurality of packet types defined by the at least one of the i) particular wireless communication protocol and ii) the particular version of the particular wireless communication protocol, and generating a second subfield that indicates a modulation and coding scheme (MCS) used for the non-legacy signal field; and
generating the non-legacy signal field according to the MCS indicated by the second subfield of the multi-bit signal field header.

5. The method of claim 1, wherein:
the at least one of the i) particular wireless communication protocol and ii) the particular version of the particular wireless communication protocol defines a plurality of packet types;
generating the multi-bit signal field header comprises:
generating a multi-bit first subfield that indicates the packet type of the PHY data unit selected from the plurality of packet types defined by the at least one of the i) particular wireless communication protocol and ii) the particular version of the particular wireless communication protocol, and
generating a second subfield that indicates a duration of the non-legacy signal field; and
generating the non-legacy signal field to have the duration indicated by the second subfield of the multi-bit signal field header.

6. The method of claim 5, wherein:
generating the multi-bit signal field header further comprises generating a third subfield that indicates a duration of the PHY data unit; and
the method further comprises: generating, at the communication device, a PHY data portion of the PHY data unit so that the PHY data unit has the duration indicated by the third subfield of the multi-bit signal field header.

7. The method of claim 1, wherein generating the non-legacy signal field comprises generating the non-legacy signal field to signal that the PHY data unit does not conform to a legacy wireless communication protocol.

8. The method of claim 7, wherein generating the non-legacy signal field to signal that the PHY data unit does not conform to the legacy wireless communication protocol comprises:
generating a cyclic redundancy check (CRC) value using bits of the non-legacy signal field according to a CRC generation technique defined by the legacy wireless communication protocol;
flipping a plurality of bits in the CRC value to generate a modified CRC value; and
including the modified CRC value in a CRC subfield of the non-legacy signal field.

9. The method of claim 8, wherein generating the CRC value further comprises using bits of the multi-bit signal field header to generate the CRC value.

10. The method of claim 1, wherein generating the non-legacy portion of the PHY preamble comprises:
generating, at the communication device, a modified repetition of the legacy signal field, the modified repetition of the legacy signal field being modified, as compared to the legacy signal field, in a predetermined manner; and
including, at the communication device, the modified repetition of the legacy signal field in the non-legacy portion of the PHY preamble to signal that the PHY data unit conforms to the at least one of the i) particular wireless communication protocol and ii) the particular version of the particular wireless communication protocol.

11. The method of claim 1, wherein generating the legacy portion of the PHY preamble comprises:
generating, at the communication device, one or more of the legacy training fields to be modified as compared to respective one or more legacy training fields defined by a legacy communication protocol to signal that the PHY data unit conforms to the at least one of the i) particular wireless communication protocol and ii) the particular version of the particular wireless communication protocol.

12. A communication device for communicating in a wireless communication network, the communication device comprising:
a wireless network interface device comprising one or more integrated circuit (IC) devices configured to:
generate a legacy portion of a physical layer (PHY) preamble of a PHY data unit, the legacy portion including a plurality of legacy training fields and a legacy signal field that indicates a duration of the PHY data unit,
generate a non-legacy portion of the PHY preamble, including:
generating a multi-bit signal field header to include a value selected from a plurality of values that correspond to at least one of i) multiple wireless communication protocols, and ii) multiple versions of one wireless communication protocol, wherein the value selected from the plurality of values indicates at least one of i) a particular wireless communication protocol from among the multiple wireless communication protocols, and ii) a particular version of the particular wireless communication protocol,
generating a non-legacy signal field having a field format that conforms to the at least one of the i) particular wireless communication protocol and ii) the particular version of the particular wireless communication protocol, comprising generating the non-legacy signal field to include: i) the multi-bit signal field header as a subfield of the non-legacy signal field and as a first set of consecutive bits in a beginning portion of the non-legacy signal field so that no other bits of the non-legacy signal field precede the multi-bit signal field header, and ii) other subfields that follow the multi-bit signal field header, the other subfields having PHY information regarding the PHY data unit, and
generating one or more non-legacy training fields;
wherein the wireless network interface device comprises one or more transceivers implemented on the one or more IC devices, the one or more transceivers configured to transmit the PHY data unit.

13. The communication device of claim 12, wherein:
the at least one of the i) particular wireless communication protocol and ii) the particular version of the particular wireless communication protocol defines a plurality of non-legacy signal field formats and a plurality of packet types;
the plurality of non-legacy signal field formats includes i) a first field format corresponding to a first packet type from the plurality of packet types, and ii) a second field format corresponding to a second packet type from the plurality of packet types, wherein the first field format corresponds to a first length of the non-legacy signal field and the second field format corresponds to a second length of the non-legacy signal field that is different from the first length; and the one or more IC devices are further configured to generate the non-legacy signal field at least by:
generating the non-legacy signal field according to the first field format when the multi-bit signal field header is generated to indicate the first packet type, comprising generating the non-legacy signal field to have the first length, and
generating the non-legacy signal field according to the second field format when the multi-bit signal field header is generated to indicate the second packet type, comprising generating the non-legacy signal field to have the second length.

14. The communication device of claim 12, wherein:
the at least one of the i) particular wireless communication protocol and ii) the particular version of the particular wireless communication protocol defines a plurality of non-legacy signal field formats and a plurality of packet types;
the plurality of non-legacy signal field formats includes i) a first field format corresponding to a first packet type from the plurality of packet types, and ii) a second field format corresponding to a second packet type from the plurality of packet types, wherein the first field format includes a first subfield for specifying a value of a first PHY parameter regarding the PHY data unit, and the second field format does not include the first subfield, and wherein the second field format includes a second subfield for specifying a value of a second PHY parameter regarding the PHY data unit, and the first field format does not include the second subfield; and
the one or more IC devices are further configured to generate the non-legacy signal field at least by:
generating the non-legacy signal field according to the first field format when the multi-bit signal field header is generated to indicate the first packet type, comprising generating the non-legacy signal field to include the first subfield specifying the value of the first PHY parameter, and
generating the non-legacy signal field according to the second field format when the multi-bit signal field header is generated to indicate the second packet type, comprising generating the non-legacy signal field to include the second subfield specifying the value of the second PHY parameter.

15. The communication device of claim 12, wherein:
the at least one of the i) particular wireless communication protocol and ii) the particular version of the particular wireless communication protocol defines a plurality of packet types; and
the one or more IC devices are configured to generate the multi-bit signal field header at least by:
generating a multi-bit first subfield that indicates the packet type of the PHY data unit selected from the plurality of packet types defined by the at least one of the i) particular wireless communication protocol and ii) the particular version of the particular wireless communication protocol, and
generating a second subfield that indicates a modulation and coding scheme (MCS) used for the non-legacy signal field; and
the one or more IC devices are configured to generate the non-legacy signal field according to the MCS indicated by the second subfield of the multi-bit signal field header.

16. The communication device of claim 12, wherein:
the at least one of the i) particular wireless communication protocol and ii) the particular version of the particular wireless communication protocol defines a plurality of packet types;
the one or more IC devices are configured to generate the multi-bit signal field header at least by:
generating a multi-bit first subfield that indicates a packet type of the PHY data unit selected from the plurality of packet types defined by the at least one of the i) particular wireless communication protocol and ii) the particular version of the particular wireless communication protocol, and
generating a second subfield that indicates a duration of the non-legacy signal field; and
the one or more IC devices are configured to generate the non-legacy signal field to have the duration indicated by the second subfield of the multi-bit signal field header.

17. The communication device of claim 16, wherein the one or more IC devices are configured to:
generate the multi-bit signal field header to include a third subfield that indicates a duration of the PHY data unit; and
generate a PHY data portion of the PHY data unit so that the PHY data unit has the duration indicated by the third subfield of the multi-bit signal field header.

18. The communication device of claim 12, wherein the one or more IC devices are configured to generate the non-legacy signal field to signal that the PHY data unit does not conform to a legacy wireless communication protocol.

19. The communication device of claim 18, wherein the one or more IC devices are configured to generate the non-legacy signal field to signal that the PHY data unit does not conform to the legacy wireless communication protocol at least by:
generating a cyclic redundancy check (CRC) value using bits of the non-legacy signal field according to a CRC generation technique defined by the legacy wireless communication protocol;
flipping a plurality of bits in the CRC value to generate a modified CRC value; and
including the modified CRC value in a CRC subfield of the non-legacy signal field.

20. The communication device of claim 19, wherein the one or more IC devices are configured to generate the CRC value further using bits of the multi-bit signal field header.

21. The communication device of claim 12, wherein the one or more IC devices are configured to:
generate a modified repetition of the legacy signal field, the modified repetition of the legacy signal field being modified, as compared to the legacy signal field, in a predetermined manner; and
include the modified repetition of the legacy signal field in the non-legacy portion of the PHY preamble to signal that the PHY data unit conforms to the at least one of the i) particular wireless communication protocol and ii) the particular version of the particular wireless communication protocol.

22. The communication device of claim 12, wherein the one or more IC devices are configured to:
modify one or more of the legacy training fields as compared to respective one or more legacy training fields defined by a legacy communication protocol to signal that the PHY data unit conforms to the at least one of the i) particular wireless communication protocol and ii) the particular version of the particular wireless communication protocol.

* * * * *